(12) United States Patent
Kirkor et al.

(10) Patent No.: US 8,623,509 B2
(45) Date of Patent: Jan. 7, 2014

(54) THERMOMETRIC CARBON COMPOSITES

(75) Inventors: Ewa Stanislawa Kirkor, Branford, CT (US); April Dawn Schricker, Fremont, CA (US)

(73) Assignee: Anchor Science LLC, Branford, CT (US)

( * ) Notice: Subject to any disclaimer, the term of this patent is extended or adjusted under 35 U.S.C. 154(b) by 951 days.

(21) Appl. No.: 11/744,846

(22) Filed: May 5, 2007

(65) Prior Publication Data

US 2010/0136341 A1 Jun. 3, 2010

Related U.S. Application Data

(60) Provisional application No. 60/746,638, filed on May 6, 2006.

(51) Int. Cl.
*B32B 9/00* (2006.01)

(52) U.S. Cl.
USPC ............................ 428/408; 423/448; 977/742

(58) Field of Classification Search
USPC ......... 428/408; 423/447.1; 313/311; 977/742
See application file for complete search history.

(56) References Cited

U.S. PATENT DOCUMENTS

2003/0122111 A1* 7/2003 Glatkowski .................. 252/500
2004/0051433 A1* 3/2004 Imai et al. .................... 313/311

* cited by examiner

*Primary Examiner* — Maria Veronica Ewald
*Assistant Examiner* — Daniel H Miller
(74) *Attorney, Agent, or Firm* — Wolf, Greenfield & Sacks, P.C.

(57) ABSTRACT

A composition of electrically conductive composites for temperature sensing comprises conductive particles. The composite forms from a suspension. The suspension comprises the particles and solvent, and the particles are conductive particles with aspect ratio larger than one. The conductive composite retains a negative temperature coefficient when in contact with certain specific surfaces. The particles within the composite self align.

23 Claims, 4 Drawing Sheets

Multiple devices demonstrating temperature sensitivity on LDPE substrate

THERMOMETRIC CARBON COMPOSITES

CROSS-REFERENCES TO RELATED APPLICATION

This application claims priority to U.S. Provisional Application No. 60/746,638 filed May 6, 2006 (Anchor Science Ref. No.: AncSci001) "Thermometric Carbon coatings" which is hereby incorporated by reference in its entirety.

BACKGROUND

The present invention is generally directed to carbon nanotube—graphene composites, their composition, and their use as temperature sensing elements in devices and articles, especially printable devices and articles of any size including microelectromechanical systems and nanoelectromechanical systems. Graphene is a single planar sheet of $sp^2$-bonded carbon atoms. Parallel-oriented stack of graphene sheets constitutes graphite. A single wall carbon nanotube (SWCNT) is a graphene sheet rolled into a cylinder. A multi wall carbon nanotube (MWCNT) comprises of multiple graphene sheets rolled into concentric cylinders or a graphene sheet rolled into a scroll or multiple graphene sheets rolled into concentric scrolls.

The temperature measurement is a fundamental and ubiquitous necessity. The temperature dependence of electrical resistance of conductive carbons, for instance solid graphite [Bedford & Quinn] has been long known and utilized for fabrication of thermometers functioning well below ambient temperature in the cryogenic range. The thermometric use of graphite has been limited to low range of temperatures because of problems relating to nonunique temperature responses and low resistivity exhibited by these materials near the ambient temperature. Carbon resistors have been used as resistive thermometers as well but their applicability is also limited to low temperatures for reasons of thermal instability, limited range of unique responses and sensitivity. These devices also exhibited nonuniformity of properties relating to composition and thermal treatment history requiring repetitive individual calibration. Carbon-glass resistive sensors exhibit good stability and monotonic change in resistance characteristic between 1.4 K and 325 K, but their reduced sensitivity (0.01 Ohm/K) above 100 K limits their usage at higher temperatures.

In case of nanodevices, the size is an essential feature. The global or remote temperature reading might not accurately reflect potentially present local variation. It is eminently important to measure temperature while using nanosensors, particularly carbon nanotube based sensors as their responses are susceptible to temperature interference. It is requisite for the temperature sensor to be of the similar size as other sensors in a set of sensors or a sensor array. If known, the temperature effect on other nano devices could be compensated for in the device calibration, improving the device's accuracy and reliability.

The need for temperature measurement on that scale is well appreciated yet, serious practical difficulties persist. Metal nanowires are used for temperature mapping at low (cryogenic) temperatures [Nalwa]. However, the nanowires exhibit positive temperature sensitivity coefficient and their stability is questionable. Recently gallium filled CNT thermometer [Gallium] has been developed for temperature range from 50° C. to 500° C. As the melting point of gallium is at about 29.78° C., gallium nanothermometer is inapplicable to bionanosensors. Another serious drawback of this thermometer is the use of transmission electron microscope for readout precluding portability of the device and severely limiting its affordability. Operating in narrower T range light emitting nanothermometer has been demonstrated by Lee, Kotov and Govorov [Lee 2005], but it is inapplicable to measuring temperatures of hidden from view objects.

The use of carbon-based inks is common in the manufacture of printed electronics, for example printed circuit boards or electrodes for sensors. In general, carbon-based ink is a composite material containing a carbon particulate such as graphite, amorphous carbon or a fullerene, suspended in a binder and a solvent. These composite materials are applied to a surface via a number of deposition techniques, and then cured that is allowed to dry, or are subjected to accelerating or enhancing curing treatment. Conductivity enhancing curing usually consists of heat treatment from 50° C. to several hundred degrees Celsius. Non-thermal curing has also been demonstrated [Kirkor]. The curing step is necessary to attain high conductivity in the resulting carbon composites. For thermal curing, the material's conductivity is temperature dependent.

On any size scale an unmanaged temperature dependence of conductivity of carbon based circuits integrated into functional blocks and applications can limit the usefulness of finished products.

Materials with unique temperature signatures, operational ranges higher than carbon-glass composites and that are compatible with printable electronics are needed. Use of graphenic carbon nanoparticles in a conductive carbon composite allows for scaling down the dimensions of the device as well as biological and chemical compatibility. An example here is the expanding presence of carbon nanotube sensors within the growing field of sensors and sensor arrays in the whole range of sizes present. In this type of sensor, a reagent specific to a given analyte is carried by a carbon conductor (E.g., Carbon Nanotube or an ensemble of Carbon Nanotubes) to make a sensing element specific to the analyte of interest. Typically, the analytical response is temperature dependent. Without temperature compensation, such devices are limited to operation in a narrow temperature range.

In the field, sensors are often subjected to temperature changes. Common temperature changes occur in the range from −80° C. to near 100° C., the most frequently measured temperature range. It is thus advantageous to measure temperature in that range and also on a similar scale as that of the size of the sensor.

The use of individual carbon nanotubes as thermometers could be possible with individual calibration. However, electrical properties of carbon nanotubes vary dependent on their internal structure and derivatization [Avouris, Gruner] rendering individual calibration so cumbersome and costly that it is impracticable. Individual cohesive bundles of parallel MWCNT under high vacuum exhibit monotonic dependence of conductivity on temperature in range from 100 to 800 K [Zhou 2004]. Similar behavior was reported for isolated graphite-metal contacts [Shklyarevskii 2005]. The electrical resistance of ensembles of carbon nanotubes depends on chemical exposure often leading to disparately different and often non-monotonic temperature dependence of the electrical properties. The phenomenon is evident by comparison of results from numerous researchers [Kaiser 1998], [Hecht 2006]. Given observed variability of conductivity of CNT containing materials, properties of individual components can not be expected of intermixed composite materials. Thus, carbon nanotubes typically have not been used for temperature sensors.

SUMMARY

In a first aspect, the present invention is a composition of a mixture of the carbon particles comprising tubular carbon particles and the planar carbon particles in a temperature sensing layer. The tubular carbon particles comprise single wall carbon nanotubes or multiple wall carbon nanotubes or non-spherical fullerenes with the ratio of diameter to length larger than one. The planar particles comprise graphite or graphene platelets with the ratio of thickness to average diameter larger than one.

In the second aspect, the present invention is the composite material of intermixed conductive cylindrical and conductive flat carbon particles obtained by deposition of a suspension (a spray, an ink, a paint, a paste or a coating) containing such particles in any ratio within the range from 1:100 to 100:1 on a substrate. The chemically compatible substrates are polyolefins, glass, Pyrex, quartz, and silicon oxides, ceramic, and metal oxide coated contact surfaces (Preferred oxides are alumina, titanium dioxide, zinc oxide and silicon oxide).

In one specific embodiment, the present, invention is a composite formed by drying a suspension comprising planar conductive particles, and tubular conductive particles in a solvent or a matrix. Preferably, the tubular conductive particles are carbon nanotubes and planar conductive particles are graphite particles. The suspension comprises the planar and the tubular particles and solvent, and the particles are conductive particles with the aspect ratio larger than one. Preferably the aspect ratio is much larger than one.

In a prophetic embodiment, the present invention is a composite comprising interspersed carbon nanotube particles and graphene particles. Preferably, carbon nanotubes particles are particles with length not exceeding 100 nm and length to diameter ratio larger than one. Additionally, the graphene particles are particles with the diameter not exceeding 100 nm and the thickness to diameter ratio smaller than one. The smallest dimension of the composite does not exceed the largest average dimension of the conductive carbon particle.

In a third aspect, the present invention is the composite and a substrate for manufacturing resistors functioning as temperature sensors.

In a fourth aspect, the present invention is the composite and a substrate for manufacturing capacitors functioning as temperature sensors.

In a fifth aspect, the present invention is the composite and a substrate for manufacturing antennas functioning as temperature sensors.

In a sixth aspect, the present invention is the composite and a substrate for manufacturing temperature sensors for nanosensor arrays.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

The present invention makes use of new composition of conductive carbon particles for preparation of electric temperature sensors. The composition allows the manufacturing of conductive carbon composites suitable for temperature measurement. Such composites are shown as a viable material for fabrication of resistive temperature sensors. The composite composition allows for scaling the size of CNT-graphite temperature sensors to that the size of other carbon nanotube ensemble bases sensors assuring compatibility of such temperature sensors with fabrication of nanosensor arrays. As temperature is a fundamental and variable environmental property, incorporation of temperature sensor in a sensor array increases usefulness of an array. This new composition leads to fabrication of temperature sensors in a simpler and lower cost procedure, as compared to other methods. In addition, the use of carbon-based coatings compositions with predictable thermal response of conductivity further allows prediction of change in EMI shielding effectiveness of carbon based coatings, thus increasing value in use of conductive carbon based composites. As combustible, such materials represent much simpler disposal requirements.

In order to obtain a composite, an intimate mixture of particles is formulated by mixing with any of the common mixing methods. The intimate mixture of particles is suspended in any of the common solvents or a common solvent mixture by any of common methods. The suspension of particles is applied by any means in the desired amount to a substrate and allowed to solidify into the composite by natural or forced solvent evaporation. To obtain the composite with useful response of conductivity to temperature, the intimately intermixed particles comprise carbon nanotube and graphite particles, carbon nanotube particles having aspect ratio of length to width larger than one and graphite particles having aspect ratio of diameter to thickness larger than one. In preferred embodiment of the present invention, the average length of carbon nanotubes is no smaller than 25 nm. The average diameter of conductive planar particles is of the same order of magnitude as the average length of the carbon nanotubes In a preferred embodiment the composite is prepared by use of a composite material containing suspension of a mixture of conductive graphite platelets and carbon nanotube particles in a solvent. The solvent may comprise a solvent mixture. The composite material may also contain binder and other optional ingredients, for example analytical chemical reagents, surfactants, viscosity modifiers, and dyes or pigments with the limitation to these that do not chemically interact with the mixture to the extent changing the temperature coefficient of the electrical resistance of the resulting material. If these components were to disturb the temperature response of the temperature sensor, such materials must be separated from the temperature sensor by a protective layer of the compatible material. The mixture of conductive graphite platelets and carbon nanotube particles may contain as little as, or less than 5% graphite by weight, the conductive particle balance being nanotubes. Wherein a nanotube is a hexagonal lattice of carbon rolled into a cylinder (a nanotube is defined by its diameter, length, and chirality, or twist. Besides having a single cylindrical wall (single wall nanotubes, or SWNTs), nanotubes can have multiple walls (multiple wall nanotubes, or MWNTs)—cylinders or scrolls inside the other cylinders or scrolls). Aggregates otherwise known as bundles of either single wall nanotubes or multiple wall nanotubes may also be used.

It is not excluded that even less than 5% of planar graphite particles in the particle composition will suffice for fabrication of adequate temperature sensors, however other than approximately cylindrical or planar carbon particle shapes are deemed detrimental to achieving temperature sensing conductive carbon composites.

Examples of low molecular weight, highly volatile solvents include: water, ethers, alcohols, ketones, hydrocarbons, halogenated hydrocarbons, preferably $C_1$-$C_{16}$, more preferably $C_1$-$C_{10}$, and mixtures thereof. Examples of alcohols include methanol, ethanol, isopropanol, perfluoropropanol, 1-butanol, 2-butanol, 2-butoxyethanol and octanol. Examples of ketones are acetone, methylethylketone, diethyl ketone. Examples of hydrocarbons include hexane, heptanes, octane, nonane, and decane, dichloromethane, chloroform, 1,1,1-trichloroethane, trichloroethylene, tetrachloroethylene, benzene, toluene, xylene, 1,2,4-trimethylbenzene, phenol and naphthalene.

Examples classes of binders include polyalkylenes, polyalkylene glycols, polyalkylene alcohols, polyalkylene glycols, polyalkylene esters, and copolymers or mixtures thereof. Specific examples of binders include polyethylene, polypropylene, polyvinyl alcohol, cellulose and cellulose derivatives, polysaccharides, polystyrol, and mixtures or copolymers thereof.

Example supports include insulators such as: paper, glass, ceramics, polymers and plastics, polyethylene and other polyolefins, as well as wood, and knit, woven, and nonwoven natural and synthetic fibrous materials.

In a resistance thermometer embodiment the solid support has electrical connections placed before or after the deposition of the thermometric coating. The electrical connections can be of any conductive material providing electrical contact with the thermometric composite, such that the contacts' and the leads' resistance is smaller than that of the composite, preferably two or more orders of magnitude smaller than the resistance of the thermometric composite.

In any of the above-enumerated and future embodiments, the sensing element, that is the thermometric composite on a support is enclosed or encapsulated in a protective enclosure or an inert layer. Such enclosure must effectively eliminate other than temperature influences on electrical resistance of the sensing element. These influences typically include pressure, light, and most importantly humidity and chemical exposures. The enclosure protects against degradation of the active temperature sensing elements to insure reproducible sensing.

In embodiments requiring electrical connections, such connections are incorporated and accessible to couple to a device for detecting a quantity indicative of electron transfer along the CNT-graphite based composite.

It is envisioned that mixtures of approximately planar and approximately cylindrical particles of other conductive or semiconductive materials in varying ratios will exhibit useful thermometric properties.

It is envisioned that orientation of the particles in the thermometric composite may affect the useful temperature range or sensitivity or temperature range and sensitivity of such composite. In the preferred embodiment the particles are randomly distributed within the composite.

The composites described above may be used to manufacture, for example, smart coatings, electronic components, electrodes, displays, and electromagnetic interference (EMI) protective and antistatic devices. Moreover, these materials are particularly useful for the manufacture of nanothermometers, resistance thermometers, temperature sensors and temperature sensing components of sensor arrays.

For example, a one to one by weight mixture of multi wall CNT (e.g., MWCNT O.D.×I.D. 40-70 nm×5-40 nm×0.5-2 μm) and graphite is mixed into the composite material. Such weight ratio of graphite particles of average diameter approximating the average length of the CNT particles assures that the total area of the planar particles is of the same order of magnitude as the product of the number of tubular particles present and of the area established by the mean square radius of gyration of the tubular particles. The resulting composite material is applied to an area of the substrate between and including terminals of electrical connectors already on the substrate. As shown in FIG. 3A, a resistive thermometer is designated generally by the reference number 10 and is hereinafter referred to as "thermometer 10." Thermometer 10 includes a substrate 12 and external leads comprising first and second electrical connectors shown at 14 and 16 disposed in electrical communication with the substrate. The substrate 12 may be glass or the like, and the first and second electrical connectors 14, 16 may be copper wires. The conductive carbon composite comprising the cylindrical and planar forms of conductive carbon as described herein is randomly distributed on and cured on the substrate 12 with one or a combination of the existing methods [Kirkor]. Subsequently, the composite is encapsulated and sealed in a protective enclosure or inert layer 18, which may comprise low-density polyethylene (LDPE). As shown in FIG. 3B, electron transport through the thermometer 10 comprises electron flow from the first electrical connector 14, through the substrate 12, and out the second electrical connector 16. The thermal response of the resistance of the composite is calibrated against traceable temperature standard, in this case a K type thermocouple. Using a DC voltmeter, the resistance can be measured and converted to temperature. The temperature calibration of a series of such devices is presented in FIG. 2.

Figure 4:
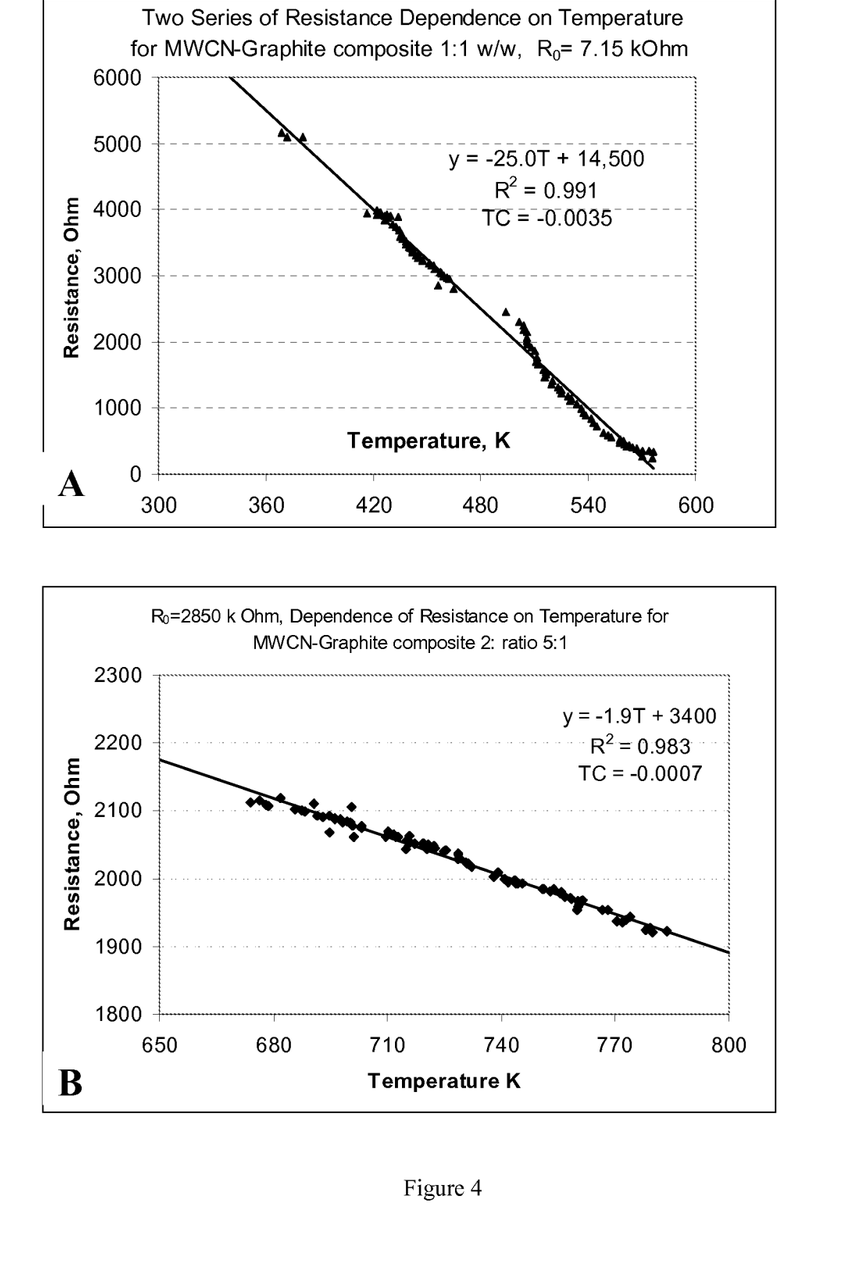
FIG. 4 illustrates the effect of MWCNT-Graphite composite loading on the temperature coefficient of resistance.

The temperature range of the device of the Example 1 is limited by the thermal properties of the encapsulating material, not the carbon composite. Graphite exhibits thermal stability to a very high temperature. (At least up to 1600° C.) Carbon nanotubes are thermally stable at least to 400° C., the lowest threshold for CNT oxidation in air. Purcell et al. [Purcell] demonstrated that a MWCNT emitter could be heated by its field-emitted current up to 2000 K and remain stable. Still resistive heating of individual MWCNT at or above 900K might cause shell breakdown and layer ablation at 200-microampere currents [J. Y. Huang 2005 & 2006]. It is demonstrated here that CNT-graphite mixtures can serve as temperature sensing materials at least up to 400° C. and envisioned that probably well above 400° C. (FIG. 4B) depending on the protective enclosure.

Certain continuous inkjet (CIJ) printers (Amir Noy, SGIA Journal, First Quarter 1999, pp. 31-33) can handle inks with large particulates that would clog the nozzles of typical inkjet printers. Thus, conductive composite materials containing carbon particles such as mixtures of graphite platelets and carbon nanotubes may also be used for printing of low cost, carbon based temperature-sensing devices.

EXAMPLES

1) Formulation of Composite Material for Manufacturing of a Painted Resistive Thermometer A 10 mg of multiwall carbon nanotubes (average length 0.5 to 2 micron) were added to 50 mg of a composite material containing 20% by weight of colloidal graphite platelets dissolved in isopropanol with small quantities of ketones and cellulosic binder. The weight ratio of graphite and CNT in the composite material was thus established as 1:1. The modified composite material was painted in approximately 0.5 cm wide, 50 micron thick, and 0.5 cm to 4 cm long traces on a glass substrate. The composite was left to dry in ambient air for several hours. Stable at room temperature conductivity of the composite samples indicated completion of the drying. Copper wire electrical connectors were affixed to the opposite ends of each carbon composite with the conductive silver (Ag) paint. The silver paint was allowed to fully cure according to its manufacturer's recommendation. The carbon composite on supporting glass and the Ag paint traces were sealed in LDPE leaving copper leads exposed. The device was placed in contact with a thermal bath of measured temperature and its resistance measured with a DC voltmeter. Each device was tested in two cycles of increasing and decreasing temperature in range from −80 to +110 C. Table 1 contains resistance values (Ohms) measured for six thermometers.

TABLE 1

Average measured resistance values (Ohm) at specified temperatures (° C.) for eight temperature sensitive conductive composite comprising graphite platelets and MWCNT.

| T [° C.] | G&C (1) | G&C (2) | G&C (3) | G&C (4) | G&C (5) | G&C (6) | G&C (7) | G&C (8) |
|---|---|---|---|---|---|---|---|---|
| 110 | 401 | 467 | 698 | 673 | 1115 | 1364 | 1985 | 2901 |
| 100 | 412 | 503.2 | 712 | 692.3 | 1140 | 1405 | 2041 | 2931 |
| 85 | 447 | 516 | 749 | 727 | 1166 | 1442 | 2074 | 2998 |
| 75 | 457 | 521 | 753 | 830 | 1170 | 1451 | 2092 | 3023 |
| 60 | 463 | 526 | 756 | 842 | 1177 | 1458 | 2131 | 3074 |
| 56 | 471.6 | 539 | 762 | 890 | 1198 | 1488 | 2156 | 3080 |
| 55 | 470 | 541 | 767 | 970 | 1205 | 1493 | 2164 | 3095 |
| 50 | 476 | 544 | 772 | 1003 | 1210 | 1510 | 2176 | 3100 |
| 36 | 473 | 544 | 772 | 1029 | 1162 | 1581 | 2128 | 3173 |
| 30 | 481 | 556 | 786 | 1087 | 1245 | 1549 | 2252 | 3189 |
| 28 | 482.5 | 561 | 792 | 1085 | 1260 | 1573 | 2272 | 3270 |
| 21 | 577 | 615 | 873 | 1008 | 1200 | 1651 | 2335 | 3300 |
| 19 | 592 | 622 | 889 | 1013 | 1208 | 1667 | 2339 | 3450 |
| 0* | 673 | 908 | 871 | 1013 | 1318 | 1646 | 2351 | 3392 |
| −13.1 | 694 | 1140 | 923 | 1148 | 1390 | 1713 | 2575 | 3600 |
| −15.5 | 717 | 1155 | 978 | 1154 | 1400 | 1749 | 2599 | 3640 |
| −45 | 1032 | 2200 | 1000 | 1227 | 1588 | 1845 | 2717 | 3832 |
| −70 | 1625 | 3164 | 1047 | 1257 | 1687 | 1861 | 2846 | 3938 |
| −80 | 1798 | 3442 | 1249 | 1247 | 1768 | 1961 | 2900 | 4010 |

The 0° C. * column contains interpolated data assuming the Arrhenius type temperature function.

Figure 1:
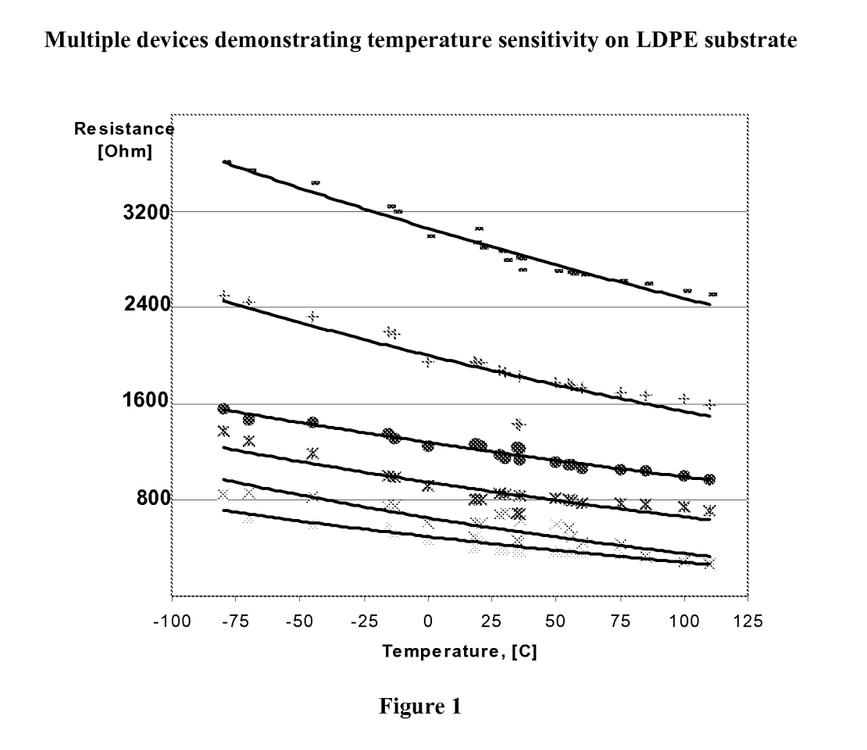
FIG. 1 illustrates the negative thermal coefficient of multiple devices on glass substrates.

The resistance change is proportional to the original device resistance and the resistance decreases with increasing temperature mimicking semiconductor behavior. Additionally, the devices demonstrate negative temperature coefficients. The graphical results plotting resistance versus temperature for 5 typical devices are shown in FIG. 1.

2) Quantifying the temperature sensitivity of the painted graphite-CNT composites. The graphite-CNT 1:1 coatings were painted on polyethylene, equipped with metal connectors, and placed in a glove bag filled with dry air. Radiant heat source was also placed in the same bag, while a K type thermocouple led to an outside Fluke 52 temperature meter was attached to the polyethylene support under the carbon composite. The connectors to the painted resistors extended outside the bag to the Fluke 75 DC voltmeter. The resistivity of the composites and the temperature registered with the thermocouple were simultaneously recorded with digital photography. The temperature range was from 20° to 60° C., narrow enough for linear approximation of the resistance change with temperature. The average calculated resistance at 0° C., $R_0$, and the slope of the resistance are displayed in Table 2 and plotted in FIG. 2.

TABLE 2

Figure 2:
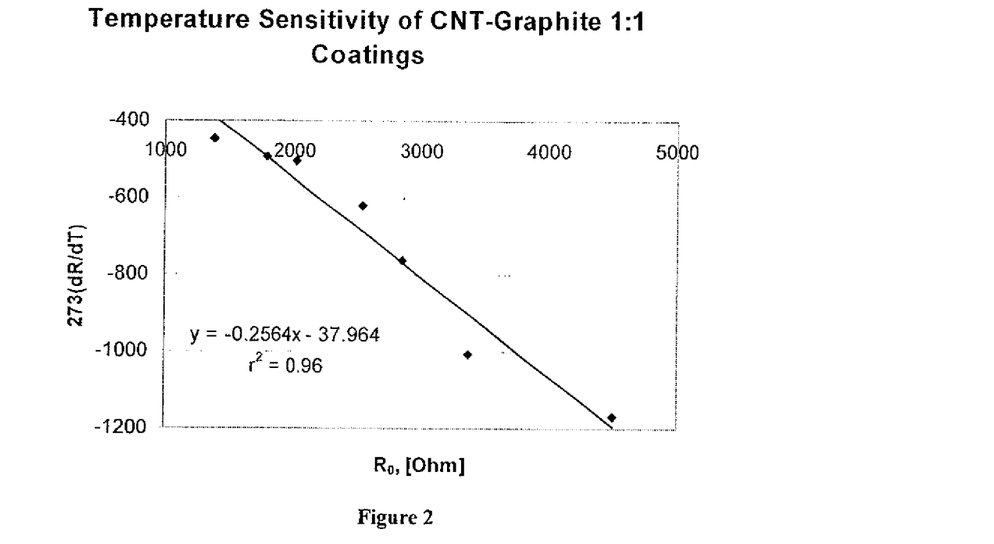
FIG. 2 illustrates the magnitude of the thermal sensitivity of the 1:1 multiple wall carbon nanotube (MWCNT) and graphite platelets composite deposited on low-density polyethylene (LDPE) of the Example 1.
Figure 3A:
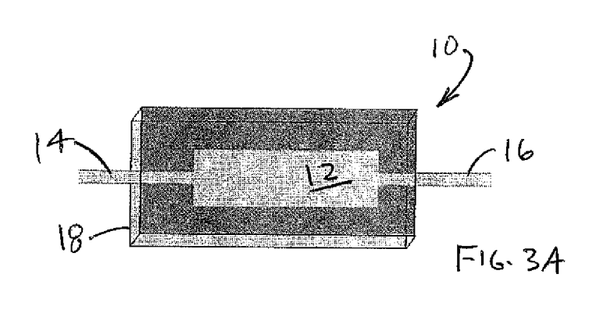
FIG. 3A illustrates the construction of the resistive thermometer of the Example 1 whose thermal characteristic is displayed in Table 1.
Figure 3B:
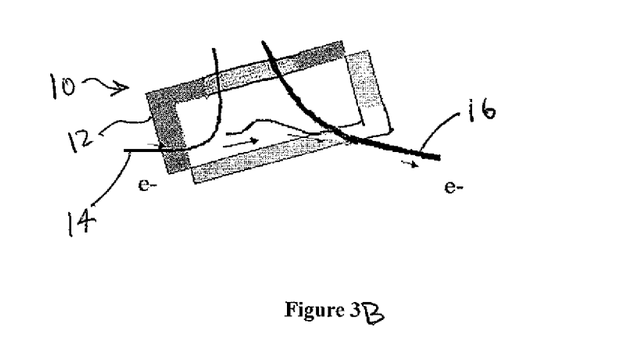
FIG. 3B illustrates a flow of electrons through the resistive thermometer of FIG. 3A.

Resistance and slope data as plotted in FIG. 2.

| Resistor | $R_0$ | Slope |
|---|---|---|
| r1 | 1383.4 | −1.63 |
| r2 | 1781.2 | −1.8 |
| r3 | 2022.7 | −1.85 |
| r4 | 2532.4 | −2.27 |
| r5 | 2856.8 | −2.79 |
| r6 | 3372.5 | −3.68 |
| r7 | 4513.5 | −4.28 |

The temperature sensitivity of the composites was calculated according to the formula $(dR/R)(dT/T)$. The sensitivity coefficient exhibited by the composites is comparable to the results obtained with graphite thermometers at cryogenic temperatures.

Composite material consisting of MWCNT and graphite in 1:1 and 5:1 ratio by weight was painted in approximately 0.5 cm wide, 50 micron thick, and 0.5 cm to 4 cm long traces on a glass substrate. The samples were subjected to high temperatures ranging from 360-580K for the 1:1 and 670-780K for the 5:1 ratios respective as seen in FIGS. 4, A and B. The change in resistance with temperature is significantly less for the device with the larger MWCNT ratio (FIG. 4, B). This is a demonstration of temperature sensitivity tuning by variation in composite material composition.

3) Composite material consisting of graphite and CNT as previously described was painted in approximately 0.5 cm wide, 50 micron thick, and 0.5 cm to 4 cm long traces on a polyethylene substrate and on glass.

Figure 5:
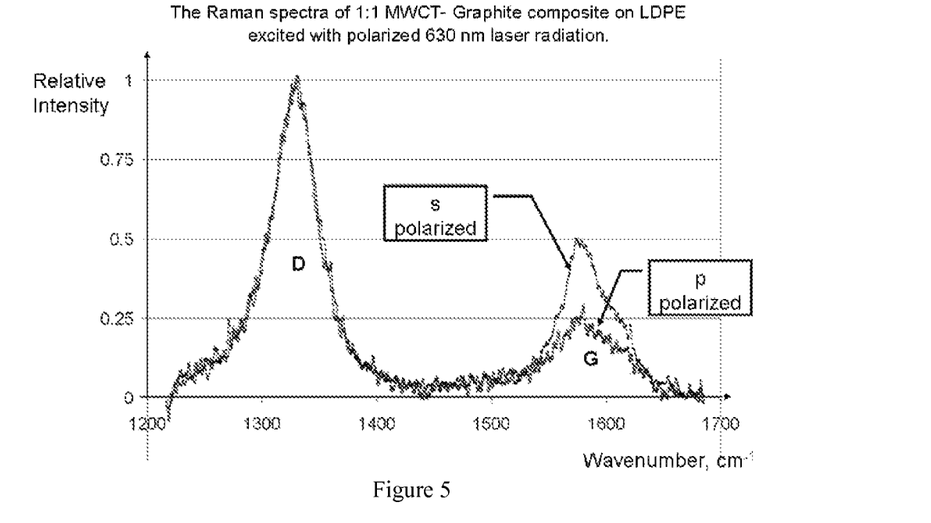
FIG. 5 illustrates the polarization of Raman spectra of the MWCNT-Graphite composite on polyethylene substrate.
Figure 6:
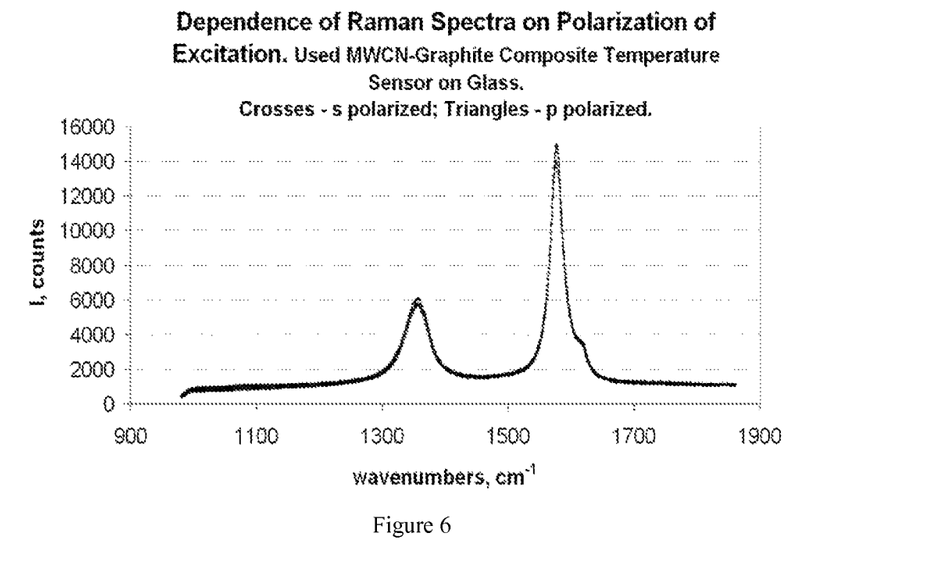
FIG. 6 illustrates the lack of polarization of Raman spectra of the MWCNT-Graphite composite on glass substrate.

The G band of the Raman spectra of the composite of composite material containing CNT and Graphite on polyethylene are polarized FIG. 5. The D band (~1320 cm$^{-1}$) is expected to be isotropic, so this is taken as an internal intensity standard and normalized to one. The intensities of the G bands (~1580 cm$^{-1}$) of the MWCNT and of graphite excited by p vs. s polarized light reveals the presence or absence of orientation in the composite material with these interpenetrating components. More of the MWCNT and graphite respond to the s polarized light than the p at the G band indicating that the MWCNTs and graphite are aligned lengthwise to the s-polarized light. Thus, both MWCNT and graphite are oriented in the layer of the composite. This alignment occurs on oriented polymeric substrates without external influence or special processing. The conductive carbon particles in the thermometric composite on glass, that is, on an amorphous substrate, display no alignment in the Raman spectra, FIG. 6. This MWCNT and graphite alignment is expected in the samples quantified for temperature sensitivity, as the same components, mixture ratios and deposition techniques were used.

4) Prophetic Example. Preparation of a resistive temperature nanosensor. The thermometer from the Example 1) is prepared by scaling down temperature sensing composite size by dispensing onto a prepared substrate about a picoliter of appropriately diluted composite material containing the preferred planar to tubular conductive particle ratio and by flash evaporation of the solvent. The surface of the support would be already equipped with pre-deposited electrical connectors to a readout device.

Such nanodevices could be conveniently mass-produced by ink-jet printing. It is envisioned that technologies similar to DIP Pen technique are capable to deposit nanosize composites suitable for the temperature sensing. The resulting composites are used individually or in multisensor arrays for determining the temperature.

REFERENCES

[Bedford & Quinn]. R. E. Bedford, T. J. Quinn "Techniques for Approximating the International Temperature Scale of 1990." 1997 reprinting of the 1990 first edition, Bureau International des Poids et Mesures, 1997

[Gallium] Y. Gao, Y. Bando 'Carbon nanothermometer containing gallium.' *Nature* 415, 599, 2002.

Yoshio Bando, Yihua Gao, Tadao Sato "Nanotube, Nano Thermometer and Method for Producing the Same" U.S. patent Ser. No. 10/357,452, filed Feb. 4, 2003.

[Avouris 98] Martel, R.; Schmidt, T.; Shea, H. R.; Hertel, T.; Avouris, Ph. 'Single and Multi-Wall Carbon Nanotube Field-Effect Transistors. Appl. Phys. Lett. 1998, 73, 2447-2449.

[Purcell] S. T. Purcell, P. Vincent, C. Journet, Vu Thien Binh, "Hot Nanotubes: Stable Heating of Individual Multiwall Carbon Nanotubes to 2000 K Induced by the Field-Emission Current" Phys. Rev. Lett., 2002, 88, 105502.

[J. Y. Huang 2005] J. Y. Huang, S. Chen, S. H. Jo, Z. Wang, D. X. Han, G. Chen, M. S. Dresselhaus, Z. F. Ren, 'Atomic-Scale Imaging of Wall-by-Wall Breakdown and Concurrent Transport Measurements in Multiwall Carbon Nanotubes' Phys. Rev. Lett. 94, 236802 (2005).]

[J. Y. Huang 2006] J. Y. Huang, S. Chen, Z. Q. Wang, K. Kempa, Y. M. Wang, S. H. Jo, G. Chen, M. S. Dresselhaus, Z. F. Ren; 'Superplastic carbon nanotubes' Nature 439, 281, 2006

[Nalwa] G. Chen, T. Borca-Tasciuc, R. G. Yang 'Nanoscale Heat Transfer' Encyclopedia of Nanoscience and Nanotechnology, H. S. Nalwa Editor, Volume X, 1-30, 2004

[heteromodel] A. B. Kaiser, G. Dusberg and S. Roth 'Heterogeneous model for conduction in carbon nanotubes' PHYSICAL REVIEW B, 57, 1418-1421, (1998)

[Kirkor] U.S. Pat. No. 7,097,788 issued Aug. 29, 2006; 'Conducting Inks' Inventors: Kirkor, Ewa Stanislawa (Branford, Conn.); Schricker, April Dawn (Austin, Tex.); Scheeline, Alexander (Champaign, Ill.); Assignee: The University of Illinois at Urbana-Champaign

[Lee 2005]. J. Lee, A. O. Govorov, N. A. Kotov, Nanoparticle Assemblies with Molecular Springs Nanoscale Thermometer, Angew. Chem. Inter. Ed., 117, 7605-7608, (2005).

[Kaiser 1998]. A. B. Kaiser, G. Dusberg and S. Roth "Heterogeneous Model for Conduction in Carbon Nanotubes", Physical Review B, 57, 1418-1421, (1998).

[Zhou 2004]. F. Zhou, L. Lu, D. L. Zhang, Z. W. Pan, S. S. Xie "Linear conductance of multiwalled carbon nanotubes at high temperatures", Solid State Communications, 129, 407-410, (2004).

[Shklyarevskii 2005]. O. I. Shklyarevskii, S. Speller, H. van Kempen, "Conductance of Highly Oriented Pyrolytic Graphite Nanocontacts.", Applied Physics A: Materials Science & Processing, 81(8) 1533-1538, (2005).

[Hecht 2006]. Hecht, D S; Hu, L.; Gruner, G., "Electronic Properties of carbon nanotube/fabric composites." Analytical and Bioanalytical Chemistry, 384, 322-325, (2006).

The invention claimed is:

1. A conductive carbon composite material comprising:
   particles of a cylindrical form of conductive carbon with an aspect ratio larger than one;
   particles of a planar form of conductive carbon with an aspect ratio larger than one,
   wherein the total area of the particles of the planar form of conductive carbon is of the same order of magnitude as the product of the number of particles of the cylindrical form of conductive carbon present and of an area established by the mean square radius of gyration of the particles of the cylindrical form of conductive carbon,
   wherein the particles of the cylindrical form of conductive carbon and the planar form of conductive carbon are dispersed in one another in the mass ratio from 1:100 to 100:1, and
   wherein the combination of the cylindrical form of conductive carbon and the planar form of conductive carbon provides a sensitivity to the change in electrical resistance in response to a temperature change, the change in electrical resistance in response to the temperature change corresponding to a monotonic function of temperature which is a linear approximation of the electrical resistance as a function of temperature.

2. The conductive carbon composite material of claim 1 delivered onto a mechanically supporting substrate by an ink, the ink comprising the cylindrical forms of conductive carbon with aspect ratio larger than one and the planar forms of conductive carbon with aspect ratio larger than one, the ink further comprising a solvent.

3. The conductive carbon composite material of claim 2, wherein the ink further comprises a binder.

4. The conductive carbon composite material of claim 2, wherein the cylindrical forms of conductive carbon and the planar forms of conductive carbon are oriented with respect to each other in a matrix defined by the ink.

5. The conductive carbon composite material of claim 2, wherein the substrate comprises one or more of aliphatic hydrocarbons, alcohols, polymers, plastics, polyethylene, polyolefins, glass, ceramics, cellulose, and cellulose derivatives.

6. The conductive carbon composite material of claim 1, wherein an average diameter of a particle of the planar form of conductive carbon is of the order of the average length of a particle of the cylindrical form of conductive carbon.

7. The conductive carbon composite material of claim 1, wherein the mass ratio of the cylindrical form of conductive carbon and the planar form of conductive carbon is about 1:2 to about 1:1.

8. The conductive carbon composite material of claim 1, wherein the particles of the planar form of conductive carbon are graphite and the particles of the cylindrical form of conductive carbon are carbon nanotubes.

9. The conductive carbon composite material of claim 1, wherein the particles of the cylindrical form of conductive carbon comprise single wall carbon nanotubes.

10. The conductive carbon composite material of claim 1, wherein the particles of the cylindrical form of conductive carbon comprise multiple wall carbon nanotubes.

11. The conductive carbon composite material of claim 1, wherein the particles of the planar form of conductive carbon are selected from the group that consists of metals and conductive polymers, and wherein the particles of the cylindrical form of conductive carbon are carbon nanotubes.

12. The conductive carbon composite material of claim 11, wherein the carbon nanotubes comprise single wall carbon nanotubes.

13. The conductive carbon composite material of claim 11, wherein the carbon nanotubes comprise multiple wall carbon nanotubes.

14. The conductive carbon composite material of claim 11, further comprising a binder.

15. The conductive carbon composite material of claim 11, wherein the particles of the cylindrical form of conductive carbon are selected from the group consisting of semiconductors and conductive polymers.

16. The conductive carbon composite material of claim 15, further comprising a binder.

17. The conductive carbon composite material of claim 1, wherein conductors are affixed to the cylindrical form of conductive carbon and to the planar form of conductive carbon.

18. The conductive carbon composite material of claim 17, wherein the mass ratio of particles in claim 1 affects the temperature sensitivity.

19. The conductive carbon composite material of claim 18, wherein increasing the ratio of the cylindrical form of conductive carbon to the planar form of conductive carbon above a ratio of 1:1 decreases the temperature sensitivity.

20. The conductive carbon composite material of claim 17, wherein the resistance decreases approximately linearly with increasing temperature.

21. The conductive carbon composite material of claim 17, wherein the temperature decreases with approximately linearly increasing resistance.

22. The conductive carbon composite material of claim 1, wherein the cylindrical forms of conductive carbon and the planar forms of conductive carbon are oriented without external influence or processing during deposition.

23. A thermometer, comprising:
an electrically insulating substrate;
particles of a cylindrical form of conductive carbon with an aspect ratio larger than one mechanically supported on the substrate;
particles of a planar form of conductive carbon with an aspect ratio larger than one mechanically supported on the substrate, the cylindrical form of conductive carbon and the planar form of conductive carbon being randomly dispersed in one another in a mass ratio from 1:100 to 100:1, the combination of the cylindrical form of conductive carbon and the planar form of conductive carbon providing a sensitive monotonic change in electrical resistance in response to a temperature change;
a first electrical connector disposed in electrical communication with the cylindrical form of conductive carbon and the planar form of conductive carbon; and
a second electrical connector disposed in electrical communication with the cylindrical form of conductive carbon and the planar form of conductive carbon;
wherein the dispersion of the cylindrical form of conductive carbon and the planar form of conductive carbon provides a linear approximation of the change in resistance as a function of temperature, and
wherein the total area of the particles of the planar form of conductive carbon is of the same order of magnitude as the product of the number of particles of the cylindrical form of conductive carbon present and of an area established by the mean square radius of gyration of the particles of the cylindrical form of conductive carbon.

* * * * *